United States Patent [19]

Püntener

[11] 4,427,411
[45] Jan. 24, 1984

[54] USE OF 1:2 CHROMIUM OR COBALT COMPLEX DYES FOR DYEING LEATHER OR FURS

[75] Inventor: Alois Püntener, Rheinfelden, Switzerland

[73] Assignee: Ciba-Geigy Corporation, Ardsley, N.Y.

[21] Appl. No.: 360,032

[22] Filed: Mar. 19, 1982

[30] Foreign Application Priority Data

Mar. 23, 1981 [CH] Switzerland ............... 1951/81

[51] Int. Cl.³ .................... D06P 1/10; D06P 3/30; D06P 3/32
[52] U.S. Cl. ............................. 8/404; 8/436; 8/437
[58] Field of Search .................. 8/404, 436, 437

[56] References Cited

U.S. PATENT DOCUMENTS 4,085,097  4/1978  Beffa et al. ............ 260/149
4,150,942  4/1979  Holliger et al. ......... 8/437

FOREIGN PATENT DOCUMENTS 260455  5/1963  Australia ............. 8/437
909904  11/1962  United Kingdom .

*Primary Examiner*—Maria Parrish Tungol
*Attorney, Agent, or Firm*—Edward McC. Roberts

[57] ABSTRACT

The dyes of the formula I indicated in patent claim 1 are suitable for dyeing furs and especially leather.

They are preferably used as a mixture with a red dye and a yellow dye for dyeing leather by the trichromatic process.

6 Claims, No Drawings

USE OF 1:2 CHROMIUM OR COBALT COMPLEX DYES FOR DYEING LEATHER OR FURS

The invention relates to the use of dyes of the formula I

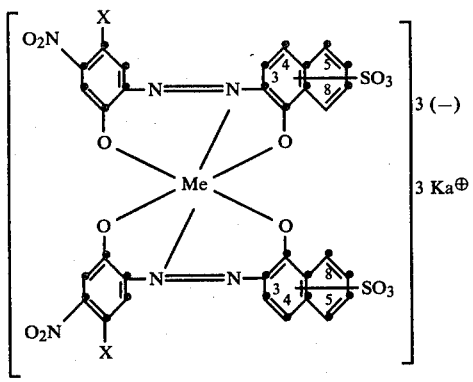

in which Me is chromium or cobalt, $Ka^\oplus$ is a cation and X is hydrogen, chlorine, methyl or methoxy and in which the $SO_3H$ groups are located in the 3-, 4-, 5- or 8-positions, for dyeing leather or furs.

X is preferably hydrogen, and most preferably chlorine, and the $SO_3H$ groups are preferably located in the 5-position, and most preferably in the 4-position.

$Ka^\oplus$ is preferably lithium or, most preferably, sodium or potassium. $Ka^\oplus$ can also be an ammonium cation or the ammonium salt of an organic amine.

The dyes are prepared in a customary manner, for example by reacting the metal-free azo dyes in a ratio of 1:2 with a chromium or cobalt donor, for example cobalt sulfate or acetate or chromium sulfate or formate, in a slightly alkaline, neutral or slightly acid solution.

The simple salts mentioned above can also be used in the presence of complexing agents, for example tartaric acid, salicylic acid or lactic acid, or can be used in the form of complex salts, such as salts of chromosalicylic acid. The metal donors are employed in a stoichiometric amount or in excess. Mixtures of monoazo dyes or single-substance monoazo dyes can be metallised. In the first case, a mixture of symmetrical and asymmetrical metal complexes is obtained. Entirely asymmetric complexes are obtained by first preparing the 1:1 complex by a known method and then preparing the corresponding 1:2 complex, using further monoazo dye. If desired, it is also possible to employ mixtures of metal donors.

The 1:2 chromium or cobalt complexes are used for dyeing furs or, preferably, leather, all types of leather being suitable, for example chrome leather, re-tanned leather or suede leather produced from goatskin, cowhide or pigskin.

Blue or violet dyeings with very good fastness properties, in particular fastness to light and wet processing, are obtained.

The dyes are preferably used for dyeing leather by means of mixtures of dyes, particularly as a mixture with a red 1:2 metal complex dye and a yellow or yellowish brown 1:2 metal complex dye, which makes it possible for the first time to dye leather by the trichromatic process. In this context, red dyes are to be understood as meaning all orange to reddish brown dyes.

It is preferable to use a mixture of dyes containing (a) a blue or violet 1:2 metal complex of the formula I indicated above, (b) a red 1:2 chromium or cobalt complex of the dye of the formula II

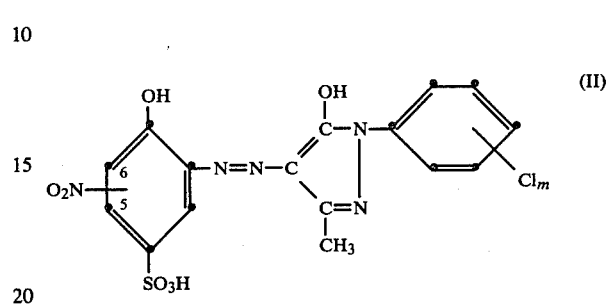

in which m is an integer from 0 to 2 and the nitro group is located in the 5-position or the 6-position, and (c) a yellow 1:2 cobalt complex of the dye of the formula III

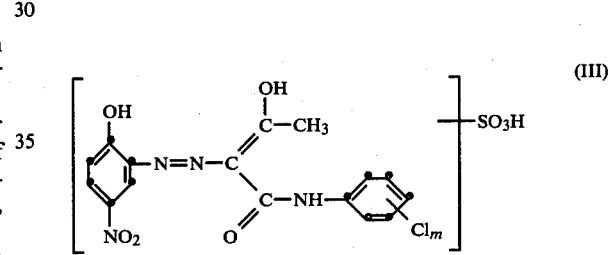

in which m is as defined above, or a yellowish brown 1:2 cobalt complex or orange chrome complex of the dye of the formula IV

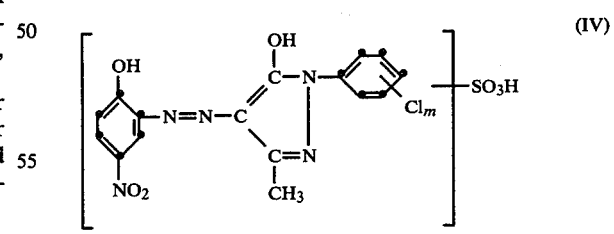

in which m is as defined above.

The examples which follow serve to illustrate the invention without limiting it thereto. The parts and percentages are by weight. The temperatures are quoted in degrees Centigrade.

EXAMPLE 1

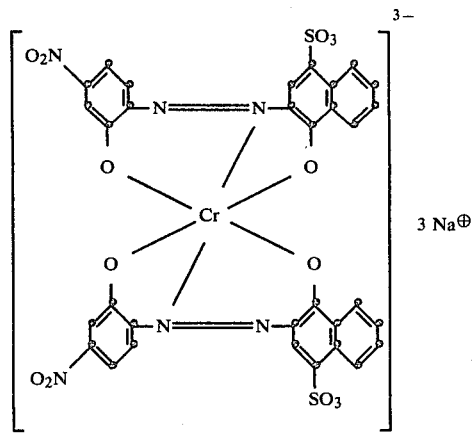

39 parts of the monoazo dye obtained by diazotising 5-nitro-2-amino-1-hydroxybenzene and coupling the product with 1-naphthol-4-sulfonic acid are dissolved in 1,000 parts of water warmed to 80°, by adding sodium hydroxide, and the solution is treated with 120 parts of a solution of sodium chromosalicylate containing 2.6% of chromium. The reaction solution is kept under reflux until the metallisation is complete. After the water has been removed on a rotary evaporator, a dark powder is obtained, which dyes leather in a blue colour shade having good fastness properties.

If potassium chloride is added to an aqueous solution of this dye, a dye is precipitated in which most of the sodium ion has been displaced by the corresponding potassium ion. The shade of the dyeing is retained and the resulting fastness properties are equivalent.

EXAMPLE 2

The above example is repeated, using 60 parts of a 1-molar solution of cobalt sulfate instead of sodium chromosalicylate. The corresponding cobalt complex, which dyes leather in a violet colour shade having excellent fastness properties, is obtained under the same reaction conditions.

EXAMPLES 3 TO 18

The procedure described in Examples 1 and 2 is repeated, but the monoazo dyes listed in the table which follows are used. After metallisation with the metal indicated in column 3, 1:2 metal complex dyes are obtained which dye leather in the shades indicated in column 4.

| Example | Monoazo dye | Metal | Shade |
|---|---|---|---|
| 3 | (structure: $O_2N$-phenyl(OH)-N=N-naphthyl(OH)($HO_3S$)) | Cr | blue |
| 4 | (structure: $O_2N$-phenyl(OH)-N=N-naphthyl(OH)($HO_3S$)) | Co | violet |
| 5 | (structure: $O_2N$-phenyl(OH)-N=N-naphthyl(OH)($SO_3H$)) | Cr | blue |
| 6 | (structure: $O_2N$-phenyl(OH)-N=N-naphthyl(OH)($SO_3H$)) | Co | violet |
| 7 | (structure: $O_2N$-phenyl(OH)($CH_3$)-N=N-naphthyl(OH)($SO_3H$)) | Cr | blue |
| 8 | (structure: $O_2N$-phenyl(OH)($CH_3$)-N=N-naphthyl(OH)($SO_3H$)) | Co | violet |
| 9 | (structure: $O_2N$-phenyl(OH)($CH_3$)-N=N-naphthyl(OH)($HO_3S$)) | Cr | blue |
| 10 | (structure: $O_2N$-phenyl(OH)($CH_3$)-N=N-naphthyl(OH)($HO_3S$)) | Co | violet |
| 11 | (structure: $O_2N$-phenyl(OH)($CH_3$)-N=N-naphthyl(OH)($SO_3H$)) | Cr | blue |
| 12 | (structure: $O_2N$-phenyl(OH)($CH_3$)-N=N-naphthyl(OH)($SO_3H$)) | Co | violet |
| 13 | (structure: $O_2N$-phenyl(OH)(Cl)-N=N-naphthyl(OH)($SO_3H$)) | Cr | blue |
| 14 | (structure: $O_2N$-phenyl(OH)(Cl)-N=N-naphthyl(OH)($SO_3H$)) | Co | violet |

| Example | Monoazo dye | Metal | Shade |
|---|---|---|---|
| 15 | 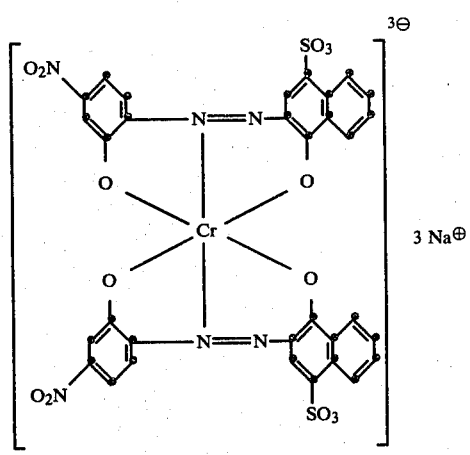 | Cr | blue |
| 16 | | Co | violet |
| 17 | | Cr | blue |
| 18 | | Co | violet |

EXAMPLE 19

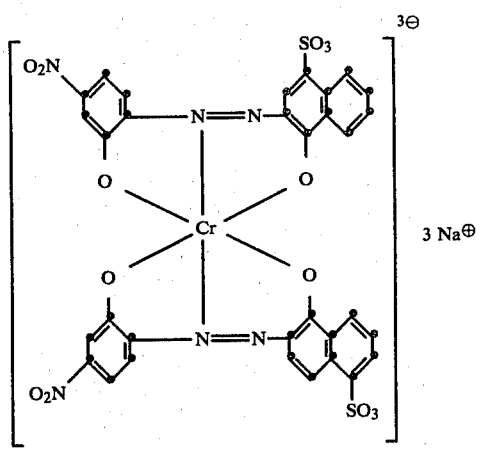

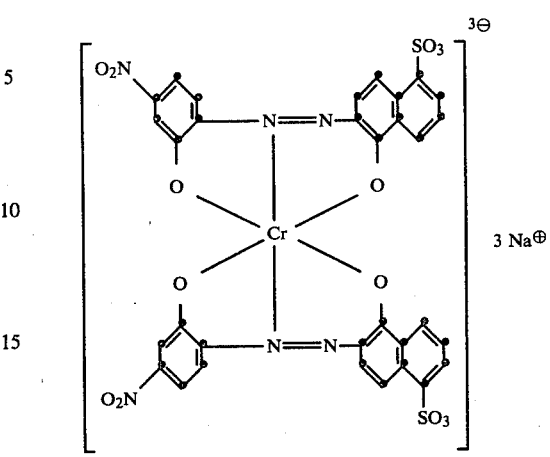

19.5 parts of the monoazo dye obtained by diazotising 5-nitro-2-amino-1-hydroxybenzene and coupling the product with 1-naphthol-4-sulfonic acid, and 19.5 parts of the monoazo dye obtained by diazotising 5-nitro-2-amino-1-hydroxybenzene and coupling the product with 1-naphthol-5-sulfonic acid are dissolved in 1,000 parts of water by adding sodium hydroxide, and the product is metallised and isolated as in Example 1. The corresponding mixture of dyes containing potassium as the cation can be obtained similarly in accordance with Example 1. Both mixtures dye leather in the same blue colour shade having very good fastness properties.

EXAMPLE 20

The above example is repeated using 60 parts of a 1-molar solution of cobalt sulfate instead of sodium chromosalicylate. The corresponding mixture of cobalt complexes, which dyes leather in a violet colour shade, is obtained under the same reaction conditions.

EXAMPLE 21

The 1:1 chromium complex compound containing 39 parts of the dye obtained from diazotised 5-nitro-2-amino-1-hydroxybenzene and 1-naphthol-4-sulfonic acid and also 5.2 parts of chromium, and 42.5 parts of the monoazo dye obtained by diazotising 4-chloro-5-nitro-2-amino-1-hydroxybenzene and coupling the product with 1-naphthol-4-sulfonic acid, are introduced successively into 1,000 parts of water and the mixture is warmed to 80°. A pH value of 7–7.5 is maintained by means of 2-normal sodium hydroxide solution. When the addition reaction to give the 1:2 metal complex dye is complete, the water is removed on a rotary evaporator. The dye dyes leather in a blue colour shade having good fastness properties.

| Example No. | 1:1 chromium complex of the azo dye | Azo dye |
|---|---|---|

Example 22: (2-OH, 4-O₂N, 5-OCH₃ phenyl)-N=N-(1-OH, 4-SO₃H naphthyl); (2-OH, 4-O₂N phenyl)-N=N-(1-OH, 4-SO₃H naphthyl)

Example 23: (2-OH, 4-NO₂, 5-Cl phenyl)-N=N-(1-OH, 4-SO₃H naphthyl); (2-OH, 4-O₂N phenyl)-N=N-(8-OH, 5-SO₃H naphthyl)

Example 24: (2-OH, 4-O₂N phenyl)-N=N-(1-OH, 2-SO₃H naphthyl); (2-OH, 4-O₂N, 5-CH₃ phenyl)-N=N-(1-OH, 4-SO₃H naphthyl)

Example 25: (2-OH, 4-O₂N phenyl)-N=N-(1-OH, 2-SO₃H naphthyl); (2-OH, 4-O₂N phenyl)-N=N-(1-OH, 5-HO₃S naphthyl)

Example 26: (2-OH, 4-O₂N phenyl)-N=N-(1-OH, 2-SO₃H naphthyl); (2-OH, 4-O₂N phenyl)-N=N-(1-OH, 6-SO₃H naphthyl)

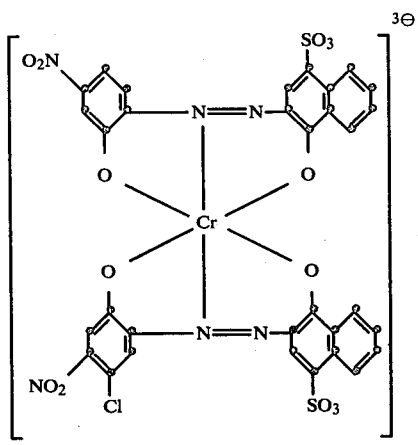

If the procedure followed is as described in the last paragraph of Example 1, the corresponding dye containing potassium as the cation is obtained. The shade of the leather dyeing obtained using this dye is the same and the fastness properties are equivalent.

EXAMPLES 22–26

Dyes having similar properties are obtained if the 1:1 chromium complex of the azo dye listed in column 1 is reacted in an analogous manner with the azo dye listed in column 2. 1:2 chromium complexes which dye leather blue, with good fastness properties, are obtained.

DYEING INSTRUCTIONS FOR LEATHER 100 parts of suede garment leather are wetted back at 50° for 2 hours in a solution of 1,000 parts of water and 2 parts of 24% ammonia, and are then dyed for 1 hour at 60° in a solution of 1,000 parts of water, 2 parts of 24% ammonia and 3 parts of the dye of Example 1. A solution of 40 parts of water and 4 parts of 85% formic acid is then added and dyeing is continued for a further 30 minutes. The leather is then rinsed thoroughly and, if desired, is also treated for 30 minutes at 50° with 2 parts of a dicyandiamino/formaldehyde condensation product. A blue dyeing which has good fastness properties is obtained.

What is claimed is:

1. A method of dyeing leather or furs, comprising the step of applying thereto a dye composition whose active dyeing ingredient consists essentially of a dye of the formula

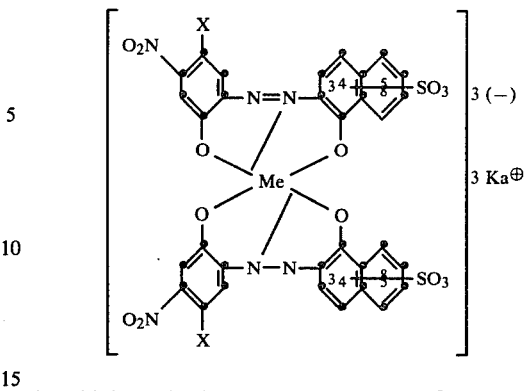

in which Me is chromium or cobalt, Ka⊕ is a cation and X is hydrogen, chlorine, methyl or methoxy, and in which the $SO_3H$ groups are located in the 3-, 4-, 5- or 8-positions.

2. The method of claim 1, wherein X is hydrogen or chlorine.

3. The method of claim 1, wherein X is chlorine.

4. The method of either of claims 1 or 2, wherein the $SO_3H$ groups are located in the 4- or 5-positions.

5. The method of claim 1, wherein X is chlorine and the $SO_3H$ groups are located in the 4-positions.

6. The method of claim 1 wherein X is hydrogen and the $SO_3H$ groups are located in the 4-positions.

* * * * *